United States Patent
Montalvo

[15] 3,696,900
[45] Oct. 10, 1972

[54] PIVOTED AND REMOVABLE POD MOUNTING FOR BRAKES AND CLUTCHES

[72] Inventor: Edwin J. Montalvo, c/o Montalvo, P.O. Box 653, 379 Union Street, Hackensack, N.J. 07602

[22] Filed: July 29, 1970

[21] Appl. No.: 59,188

[52] U.S. Cl. .................. 192/70, 188/71.3, 188/71.6, 188/73.6, 188/264 E, 192/85 AB, 192/113 B
[51] Int. Cl. .............................................. F16d 13/38
[58] Field of Search ....192/70, 85 AB, 113 A, 113 B; 188/71.3, 71.6, 73.3, 73.4, 264 E

[56] References Cited

UNITED STATES PATENTS

| | | |
|---|---|---|
| 2,756,844 | 7/1956 | Chamberlin et al. ...... 188/73.3 |
| 2,915,147 | 12/1959 | Davis .................... 188/73.4 |
| 3,311,205 | 3/1967 | Suppes et al. .......... 188/71.3 X |
| 2,165,978 | 7/1939 | Miller .................... 188/71.6 X |
| 3,081,843 | 3/1963 | Dotto et al. ............. 188/73.6 |
| 3,237,738 | 3/1966 | Suppes et al. .......... 188/71.6 X |

Primary Examiner—Allan D. Hermann
Attorney—Albert M. Parker

[57] ABSTRACT

An improvement in a pivoted mounting system for a frictional brake or clutch which facilitates access to working parts for inspection and maintenance. Three sector shaped bodies or pods carry friction members operable to contact relatively rotatable plates. Each of the sector shaped pods is independently outwardly pivotable about either of its ends to expose the working parts. The pivot arrangement includes hooks on each end of each sector shaped pod for rotation about a pivot pin. Each sector shaped pod may alternatively be lifted out of the mechanism entirely by disengagement of the hooks of both ends from their pins.

10 Claims, 3 Drawing Figures

INVENTOR
EDWIN J. MONTALVO
BY Albert M. Parker
ATTORNEY

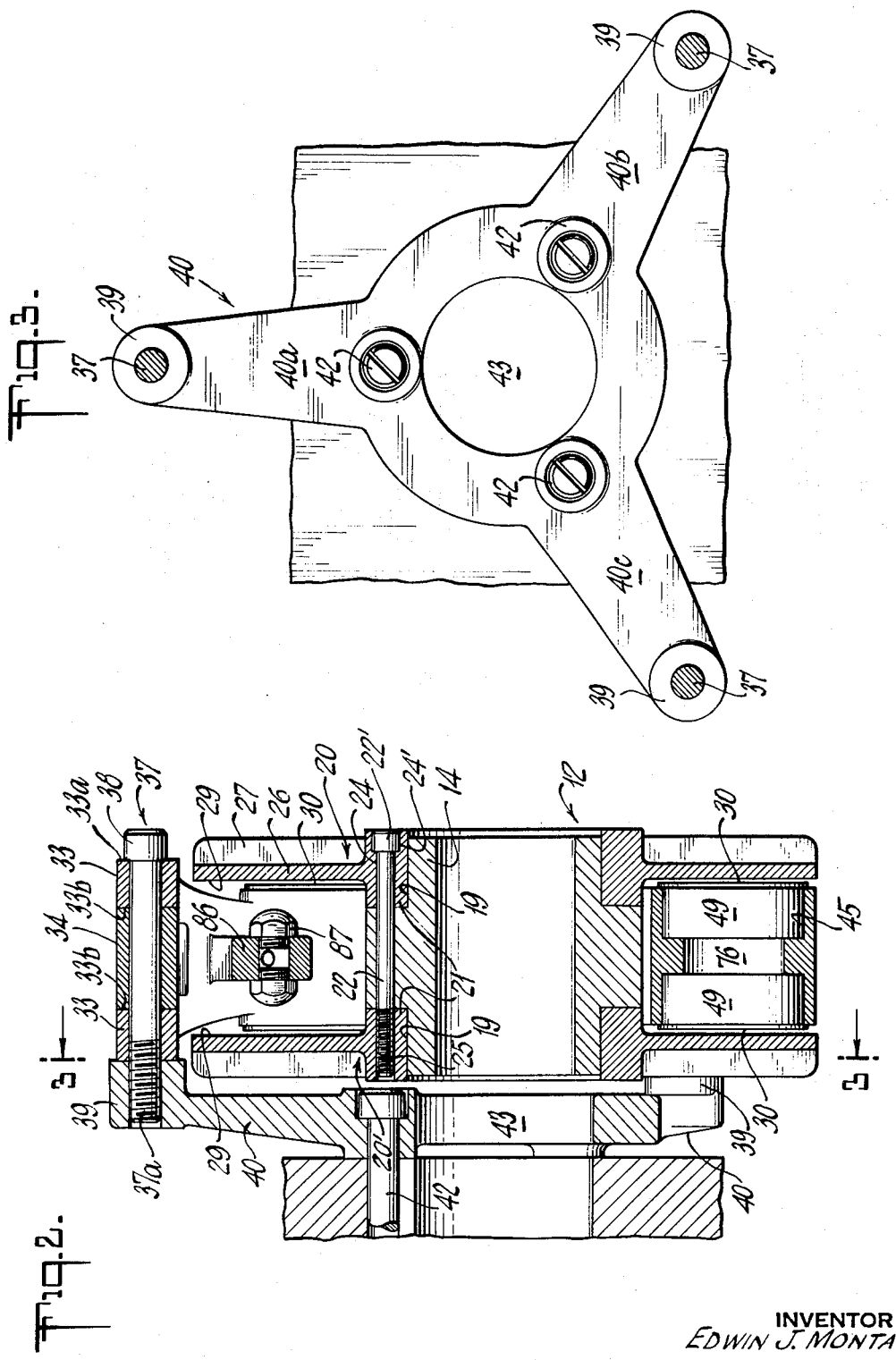

PIVOTED AND REMOVABLE POD MOUNTING FOR BRAKES AND CLUTCHES

CROSS REFERENCE TO RELATED APPLICATIONS

The present invention represents an improvement upon the invention disclosed and claimed in U. S. Pat. Nos. 3,237,738 and 3,311,205, and in U. S. application, Ser. No. 846,392, now U.S. Pat. No. 3,584,717 all assigned to the assignee of this application, the disclosures of which are all incorporated herein by reference in their entirety.

BACKGROUND OF THE INVENTION

The present invention relates to an improvement in friction brakes and clutches, and more specifically to improved mounting arrangement therefor. In the past, access to the friction pads and working parts of disc brakes and clutches has been a problem, usually requiring that the brake or clutch be substantially dismantled and involving considerable down-time. Repair and inspection are especially difficult when the brake or clutch is a massive device of the type used for controlling heavy machines such as large presses.

The above mentioned prior copending application, Ser. No. 846,392, alleviates this difficulty by providing a pivotal mounting system, but in some installations there is not always adequate room for pivoting out of the parts to which access is sought.

SUMMARY OF THE INVENTION

The present invention solves the problem of access to the working parts of brakes and clutches for inspection and maintenance by providing for both outward pivoting of pods housing the working parts and easy removal of the pods from the friction coupling assembly. Two generally annular plates having spaced opposed friction surfaces are secured to a hub for rotation with the hub. Friction compling devices, in the form of pistons operable to thrust friction pads outwardly into frictional engagement with the friction plates, are arranged between the plates.

The pistons are slidably fitted within cylinders in pairs, back to back, for opposed outward movement, bringing their friction pods into balanced frictional engagement with the spaced opposed plate surfaces. In accordance with the mounting arrangement of this invention two pairs of back to back piston and cylinder assemblies are mounted in each of a plurality of sector-shaped bodies, or pods, normally positioned between the opposed inner friction surfaces of the annular plates. Preferably three such sector-shaped pods are provided, each pod extending through an arc of about 120°. At their ends the sector-shaped pods carrying the piston assemblies are formed with hook-like fittings for detachable mounting on pins. Each sector-shaped pod may be either removed completely from the mechanism by detaching both of its hook-like fittings from their respective pins, or may be pivoted outward about either end after detaching the hook-like fitting of its opposite end from its pin.

Either by the removal or pivotal movement of a sector-shaped pod, the friction piston assemblies mounted therein may be inspected or repaired without disassembly of the entire brake or clutch.

An object of the invention is to provide an improvement in friction brakes and clutch mechanisms.

Another object of the invention is to provide an improved system for mounting frictional brake or clutch mechanisms wherein pivotal mounting of parts permits easy access for repair and inspection.

A further object is to provide a novel mounting arrangement of friction assemblies in bodies or pods which are alternatively pivotable on or removable from a friction coupling mechanism.

Yet another object of the invention is to provide a hose connection arrangement in a friction brake or clutch mechanism having a pivotable and removable mounting system.

These and other features of the invention will be better understood by referring to the accompanying drawings taken in conjunction with the following detailed description of an embodiment of the invention.

BRIEF DESCRIPTION OF THE DRAWINGS

FIG. 2 is an enlarged view in section through the mechanism of FIG. 1, the section being taken along the lines 2—2 of FIG. 1 and looking in the direction of the arrows.

FIG. 3 is a plan view of a tripod mounting according to the invention.

Figure 1:
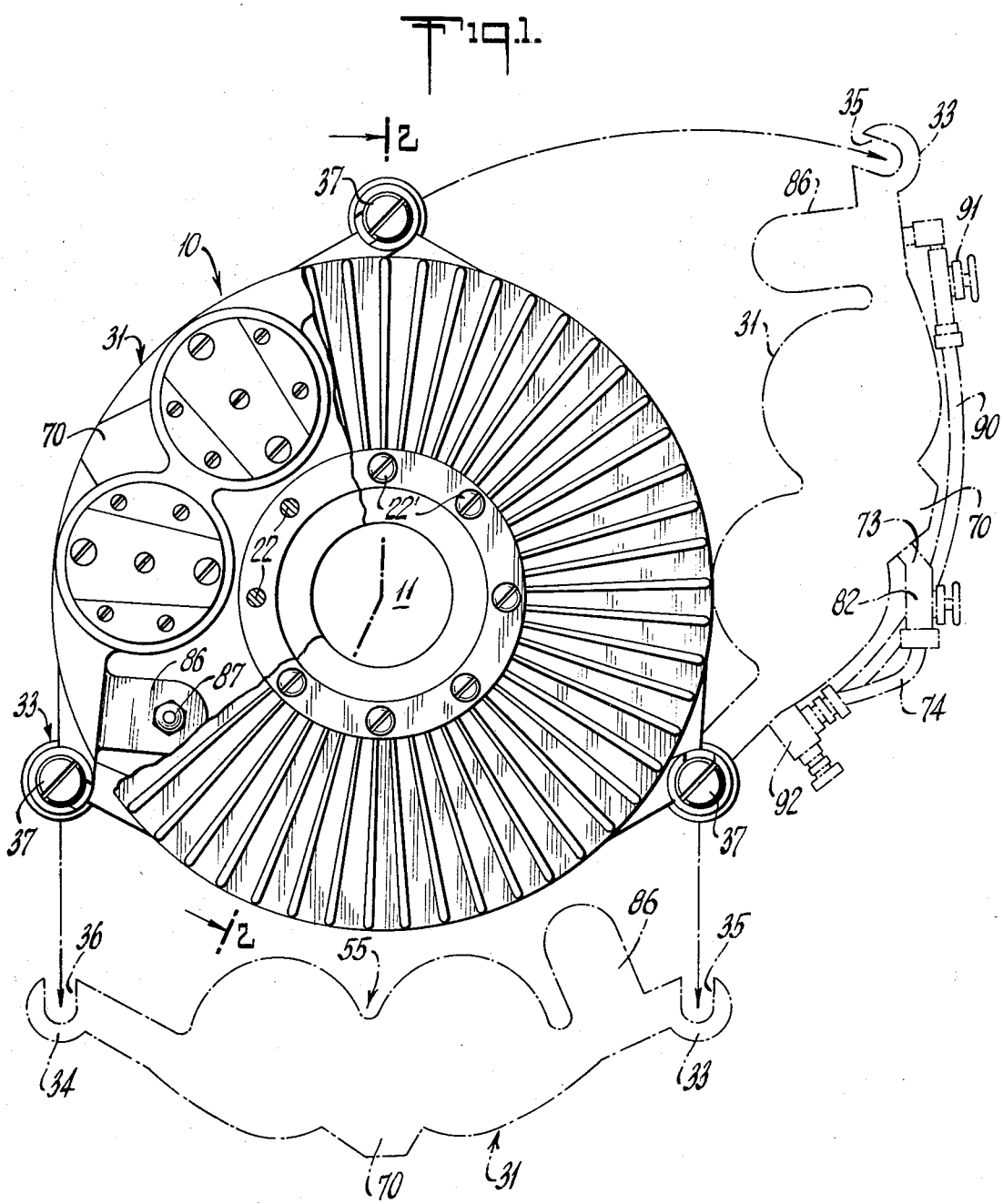
FIG. 1 is a front view in elevation of a friction coupling mechanism incorporating the improved mounting system of the invention, a part of the friction plate nearer the reader in the figure being broken away to show internal structure. The positions of sector-shaped pods upon pivoting and during removal are shown in shadow lines.

A mechanism mounted according to the invention is illustrated herein by FIGS. 1-3 in an embodiment adapted to function as a friction brake for selectively frictionally engaging a relatively rotatable member with a member fixed against rotation. Of course, the mounting system could be used in connection with other types of friction coupling mechanisms, such as clutches for selectively frictionally coupling two rotatable elements. In the embodiment shown, the brake, generally designated by reference character 10, is adapted to selectively frictionally couple a rotatable shaft 11 to a non-rotatable tripod mounting fixture or bracket 40 so as to bring the shaft 11 to a stop and to restrain it against rotation. The mechanism includes a rotor 12 which is fixedly secured to shaft 11, as for example by a key and keyway (not shown).

The rotor 12 has an annular sleeve-like hub 14 with an annular seat 19 on each side thereof, as best shown in FIG. 2. Each seat 19 accurately receives an inner, thickened edge 21 of a respective one of two opposed similar friction plates 20, 20'. The friction plates 20, 20' are securely held on the hub 14 and retained against rotation relative thereto by a plurality of bolts 22 which extend parallel to the shaft 11 through angularly spaced bores 24 in the inner edge 21 of each of the plates 20, 20' and through corresponding aligned bore holes in the hub 14. A threaded end 25 of each bolt 22 is engaged by threads formed in the bolt hole through the plate 20', and the heads 22' of the bolts are received by corresponding recesses 24' in the plate 20.

Each plate 20, 20' has an outer portion 26 which is somewhat thinner than the inner portion 21. The outer plate portions 26 have a plurality of radially directed cooling fins 27 formed integrally with the plate. The inner face 29 of each plate 20, 20' is flat and annular and lies in a plane transverse to the axis of shaft 11. The brake 10 in the illustrative embodiment includes a plurality (six shown) of opposed pairs of friction members 30 in the form of discs mounted on pods 31 which are fixed against rotation with respect to the shaft 11. The friction members 30 are adapted to be selectively forcibly thrust outwardly into frictional contact with the respective flat faces 29 of the opposed plates 20 and 20'.

As shown in FIGS. 1 and 2, two pairs of opposed friction members 30 are mounted in each of three sector-shaped bodies or pods 31 which are disposed coaxially of the shaft 11 and rotor 12 and are spaced at equal angles from each other. Extending from one circumferential end of each sector-shaped body 31 are a pair of spaced outer hook fittings 33. The inner sides 33b of the hook fittings 33 are spaced from each other. The other circumferential end of each pod 31 has one centrally disposed inner hook fitting 34 which is somewhat thinner than the space between the inner sides 33b of the outer hook fittings 33, so that each inner hook fitting 34 can be received between a pair of overlapping outer hook fittings 33 of the next adjacent sector-shaped pod 31.

The inner and outer hook fittings 34 and 33 are similar in profile, and terminate in rounded ends as shown in FIG. 1. The hook fittings 33 and 34 may be integrally formed with their respective pods 31 or may be secured thereto by welding or other suitable means.

Aligned slots 35 and 36 extend parallel to the shaft 11 through the hook fittings 33 and 34 respectively, near the rounded ends of the fittings in the area where the fittings 33 and 34 of adjacent pods 31 are overlapped. The slots 35 and 36 of the hook fittings 33 and 34 at the opposite ends of each pod 31 preferably lie parallel to each other for simultaneous disengagement upon lifting of the pod 31 from the assembly. Pivot pins 37 are received in the slots 35, 36 of each set of overlapped hook fittings 33, 34. Thus three pivot pins 37 are used in mounting the assembly of three sector-shaped pods 31, the pivot pins 37 being angularly spaces essentially 120° from each other. Each pivot pin 37 has an enlarged head 38 which lies adjacent the outer side 33a of an outer ear 33 as shown at the upper right side of the brake 10 in FIG. 2. A washer may underlie each pivot pin head 38. The other end of the pivot pin 37 is threaded, as shown at 37a in FIG. 2, to be screwably received in a cup-shaped, internally threaded socket fitting 39 extending outwardly toward the brake 10 from the mounting fixture 40. Loosening of a pivot pin 37 permits the disengagement of the hook fittings 33 and 34 which receive the pin in their respective slots 35 or 36.

The mounting fixture 40, best shown in FIGS. 2 and 3, is secured to a fixed structure such as the frame of a machine in connection with which the brake 10 is used by a plurality of bolts 42 and a generally circular opening or passage 43 is provided centrally through the mounting fixture 40 to receive the rotatable shaft 11.

As shown in FIG. 3, the mounting fixture 40 is preferably in the form of a three pointed star, with legs 40a, 40b and 40c forming the points. Near the end of each leg of the fixture is an outwardly extending socket fitting 39, which is threaded to receive the threaded end 37a of a pivot pin 37. Of course, if there were a different number of pods 31, there would be a corresponding number of legs on the fixture 40 for securing the pins 37.

When access to the working parts housed in the sector-shaped pods 31 is necessary, any or all of the bodies may be swung out around either of its pivot pins 37, through the position shown in dashed lines at the right in FIG. 1. Thus the removal of the friction plates 20, 20' is not necessary for access to the friction members 30. In this respect the mounting system resembles that of the aforementioned patent application, Ser. No. 846,392.

Alternatively, the pods 31 may be translated out from their working positions by loosening the two pivot pins 37 securing their opposite ends and disengaging the hooks 33 and 34 at both ends from the pivot pins 37. The position of a pod 31 after such disengagement is shown at the bottom of FIG. 1 in shadow lines. Thus, if there would not be adequate access for repair or inspection of the working parts upon pivoting of a pod 31 about one of its ends as described, the entire pod 31 may be readily lifted out of its working position between the friction plates 20, 20'.

The mounting system of this invention is suitable for use in connection with many different clutch and brake assemblies. The drawings show the mounting system used in connection with a friction coupling mechanism in which each of the pods 31 is preferably provided with two angularly spaced sets of opposed fluid operated reciprocating piston assemblies 49 of the diaphragm type which thrust the friction members 30 against the faces 29 of the plates 20, 20'. The reciprocating cylinder assemblies are preferably of the type disclosed in the above-mentioned U.S. Pat. No. 3,311,205 and in application, Ser. No. 846,392, but they may be of any other suitable design, as will be understood by those familiar with hydraulic and pneumatic brakes and clutches. Each assembly 49 has a friction disc or pod 30 of suitable friction material mounted for outward movement upon the introduction of hydraulic or pneumatic fluid under superatmospheric pressure to a chamber 76 formed between the two opposed assemblies 49.

When the chamber 76 is only under ordinary atmospheric pressure, the piston assemblies are retracted as shown in FIG. 2 with their friction members 30 disengaged from the opposed friction plate surfaces 29. Suitable retracting spring members such as those described in U.S. Pat. No. 3,311,205 preferably are provided to maintain the friction members in their retracted position and to return the assemblies to the retracted position upon subsidence of fluid pressure in the chamber 76.

Each pair of piston assemblies 49 is accurately fitted within a bore 45 formed through the pod 31, each pod 31 having two such bores 45. As shown in FIG. 1 the pod 31 is shaped to accomodate the piston assemblies 49 without excess mass. Thus in cross section, the pod 31 has a transversely narrowed middle section at 55 between the portions through which the bores 45 extend. The pods 31 are preferably of this "streamlined" configuration for lightness and to avoid overheating.

As shown at the top of FIG. 2 the hook fittings 33 preferably extend from the body of the pod 31 in a smoothly curving Y shape to embrace the hook fitting 34 of the adjacent pod, thus avoiding unnecessary weight and facilitating handling.

Hydraulic or pneumatic fluid under pressure is supplied to the chambers 76 for actuation of the piston assemblies through a system of tubes or hoses shown at the right in FIG. 1. Though the tubes or bores are only illustrated for one of the pods 31, it will be understood that each pod 31 is similarly supplied.

Each pod 31 has an outwardly extending central projection 70 located near its narrowed portion 45. The projection 70 is flattened at its top so that it does not extend beyond the edges of the plates 20, 20'. Inlet passages bored through the projections 70 communicate with the chambers 76 between the piston assemblies 49 for supplying fluid under pressure to the chambers 76 and thereby cause the friction members 30 of the assemblies 49 to engage the confronting surfaces 29 of the plates 20 and 20'. The outer ends of the inlet passages are threaded to receive nipples such as the nipple 73 of a fluid branch supply pipe 74 as shown in FIG. 1. Preferably the passages intersect in all but one of the pods 31 so that both pairs of piston assemblies 49 in these pods will be actuated simultaneously. In the other pod individual unconnected passages (not shown) may be provided to supply fluid separately to the two chambers 76 thereof.

Each branch supply pipe, like the branch supply pipe 74 shown, is provided with a shut-off valve 82. The operation of these valves 82 is similar to that disclosed in application, Ser. No. 846,392. All of the supply pipes are connected in a suitable manner to a main supply pipe provided with a main control valve. When the valves 82 are suitably manipulated, two, four or six of the opposed pairs of fluid actuated piston assemblies 49 may be operated when the main control valve is opened. In order to permit operation of the mechanism 10 with any member from one to six pairs of piston assemblies 49 in operative condition, an extra shut-off valve (not shown) is preferably provided for one pod 31 in which the supply passages do not intersect. This extra shut-off valve permits the independent control of one pair of piston assemblies 49 so that an odd number of piston assemblies 49 will be operative.

The pipe 74 and the other branch pipes which supply fluid under pressure to the piston assemblies 49 of each pod 31 are preferably of flexible material so that the pods 31 may be readily moved as described above.

The mechanism 10 as shown in FIGS. 1 and 2 is provided with cooling means for the plates 20 and 20' in addition to the cooling fins 27 thereon. This cooling is effected by three double ended cooling nozzles 87, one such double ended nozzle 87 being located generally inwardly of each of the pins 37. The nozzles 87 are supported by inwardly directed ears 86 formed on the pods 31 near the hook fittings 34.

Each end of each of the double ended nozzles 87 has a nozzle opening for discharging cooling fluid against the inner faces of the plates 20, 20'. A convenient and preferred manner of supplying cooling fluid to the nozzles 87 is shown in FIG. 1 wherein a cooling fluid hose 90, having a shut-off valve 91 supplies fluid to each nozzle 87 through a passage formed through the ear 86 which supports the nozzle. A main control valve for the entire cooling fluid system is also provided as shown at 92.

The brake 10 may also be provided with guide means for the frictional members or pods 30 as disclosed in U.S. Pat. No. 3,311,205. Such means are not shown in the drawings for the sake of simplicity, but the advantages and mode of use in a mechanism according to the present invention will be apparent to those skilled in the art.

Only one embodiment of the invention has been illustrated and described in detail, but it will be obvious that various changes and modifications can be made without departing from the spirit and scope of the invention. For example, a different number of pods might be advantageously mounted according to the invention, or a different number of piston assemblies could be mounted in each pod.

What is claimed is:

1. A pivoted and removable pod assembly for use in a friction coupling mechanism of the type wherein relative rotation between two bodies is controlled by selective engagement of friction members, comprising: a pod carrying friction members; hook fittings on said pod located near opposite ends of said pod, said hook fittings including slots open at one end, fixed mounting pins normally received by said hook fittings, whereby the hook fitting of either end of said pod is releasable from said pin in an outward direction and also pivotable about said pin by simply loosening the pins.

2. The pod assembly of claim 1 wherein the pod is generally sector shaped.

3. The pod assembly of claim 1 wherein the hook fitting near one end of said pod is formed as a double hook and the hook fitting near the other end of said pod is formed as a single hook so that the single hook of a pod may engage a pin while interleaved between hook elements of the double hook of an adjacent pod engaging the same pin.

4. The pod assembly of claim 1 wherein a plurality of friction devices operable to thrust pairs of friction pads outwardly in mutually opposite directions for engagement of the friction coupling mechanism are housed by the pod.

5. The pod assembly of claim 4 wherein said friction devices are fluid actuated and including means for selectively supplying fluid to said friction devices.

6. The pod assembly of claim 1 wherein the pod is generally sector shaped, said hook fittings being formed as extensions from opposite ends of the pod, the slot formed in the hook fitting of one end of the pod being disposed at an angle of substantially 120° with respect to the slot formed in the hook fitting of the opposite end of the pod, whereby three pod assemblies with three equally radially spaced mounting pins may be arranged in a generally annular plan between opposed friction surfaces of a friction coupling mechanism.

7. The pod assembly of claim 1 wherein the pod has spaced parallel bores formed therethrough, each bore housing a piston assembly.

8. The pod assembly of claim 7 wherein each bore houses a pair of opposed piston assemblies.

9. The pod assembly of claim 8 wherein the pairs of piston assemblies are independently operable.

10. The pod assembly of claim 1 including fluid cooling means mounted on the pod for cooling the friction coupling mechanism.

* * * * *